United States Patent [19]
Braithwaite et al.

[11] Patent Number: 4,842,630
[45] Date of Patent: Jun. 27, 1989

[54] MANUFACTURE OF GLASSWARE ARTICLES OF IMPROVED STRENGTH

[75] Inventors: David Braithwaite, Doncaster, England; Robert J. Douglas, North Granby, Conn.; Stanley P. Jones, Doncaster, England; James P. Poole, Brockway, Pa.; Harold Rawson, Sheffield, England

[73] Assignee: International Partners in Glass Research, Windsor, Conn.

[21] Appl. No.: 195,143

[22] Filed: May 18, 1988

[30] Foreign Application Priority Data

May 18, 1987 [GB] United Kingdom ............. 8711679

[51] Int. Cl.$^4$ ............. C03B 9/193; C03C 10/04; C03C 17/02; C03C 21/00
[52] U.S. Cl. ............. 65/30.14; 65/33; 65/60.5; 65/60.7; 65/60.8; 65/82; 65/111
[58] Field of Search ............. 65/30.1, 30.14, 33, 65/60.5, 60.7, 60.8, 82, 111, 127

[56] References Cited

U.S. PATENT DOCUMENTS

| | | | |
|---|---|---|---|
| 1,952,454 | 3/1934 | Nash. | |
| 2,336,822 | 12/1943 | Wadman. | |
| 2,500,105 | 3/1950 | Weber. | |
| 2,904,713 | 9/1959 | Heraeus et al. | 65/30.1 X |
| 3,615,319 | 10/1971 | Shonebarger | 65/30.14 |
| 3,653,862 | 4/1972 | Lynch | 65/33 X |
| 3,737,294 | 6/1973 | Dumbaugh et al. | 65/33 |
| 3,828,770 | 11/1974 | Stookey et al. | 65/30.14 X |
| 3,846,099 | 11/1974 | Simmons | 65/30.14 |
| 3,846,103 | 11/1974 | Rowe | 65/79 |
| 3,907,534 | 9/1975 | Jonsson et al. | 65/30.1 |
| 4,164,402 | 8/1979 | Watanabe | 65/30.14 |
| 4,290,793 | 9/1981 | Brockway | 65/30.14 |
| 4,457,771 | 7/1984 | Ambrogi | 65/127 |

FOREIGN PATENT DOCUMENTS

| | | |
|---|---|---|
| 0137354 | 7/1985 | European Pat. Off. . |
| 2160952 | 6/1973 | Fed. Rep. of Germany. |
| 2097781 | 11/1982 | United Kingdom. |

Primary Examiner—Robert L. Lindsay
Attorney, Agent, or Firm—Burns, Doane, Swecker & Mathis

[57] ABSTRACT

An article of glassware, particularly a glass container, of increased strength is made by a process in which the parison is treated in a manner which will cause the glass in the outer surface layer of the formed glassware article to be in a state of compression. Preferably a glaze having a coefficient of thermal expansion lower than the coefficient of thermal expansion of the glass of the parison is applied to the outer surface of the parison. Advantageously, the glaze is applied to the parison by a flame spray method or by dipping the parison into a fluidized bed containing powdered glaze.

As an alternative, the glaze applied to the outer surface of the parison may be capable of being at least partially crystallized, after the glassware article has been formed from the parison, to produce an outer surface of the glassware article having a lower coefficient of thermal expansion than the base glass of the glassware article.

Alternatively to the application of a glaze, glass in the outer surface of the parison may be chemically changed so that the surface glass in the parison has a higher transformation temperature than the remainder of the glass in the parison.

Additionally, the interior surface of the parison may be treated by a material producing active gases so that a compressive layer is produced on the internal surface of the final glassware article, at least partially balancing the compressive layer in the outer surface of the glassware article.

23 Claims, 1 Drawing Sheet

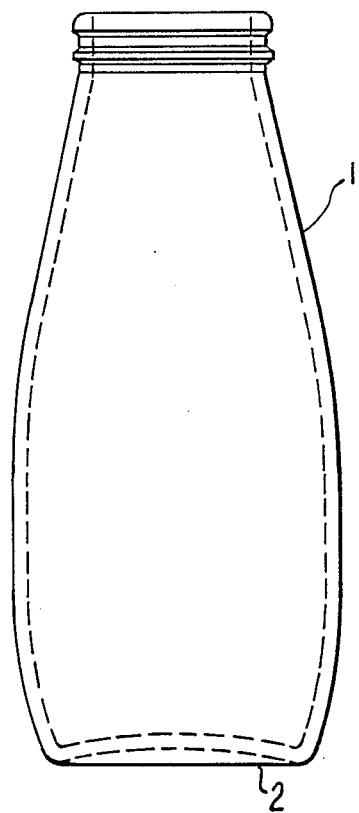
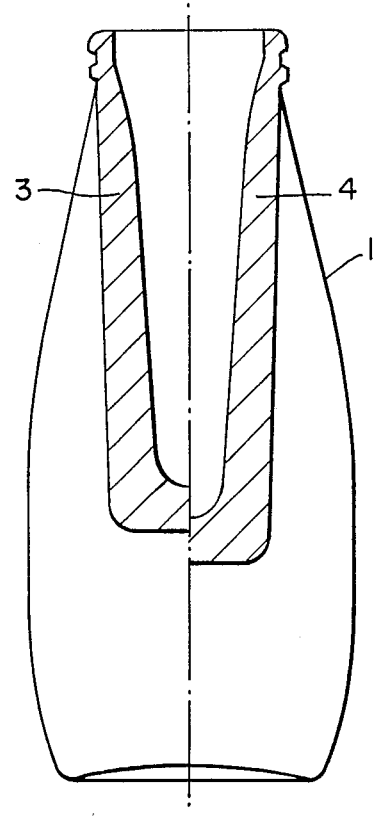

MANUFACTURE OF GLASSWARE ARTICLES OF IMPROVED STRENGTH

BACKGROUND OF THE INVENTION

The present invention relates to the manufacture of glassware articles, and in particular to manufacture of such articles of improved strength.

It has been well known for many years that the strength of glassware articles such as glass containers is limited by surface flaws which act as stress raisers and points of failure if the glass surface is put into tension. Many proposals have been made for methods of increasing the strength of glass containers by treatment of the containers and these proposals have included many in which attempts have been made to generate a surface layer on the glass container which surface layer is in compression.

One example of such a process is the dipping of the glass container into an ion exchange bath consisting of a mixture of molten salts in order to exchange sodium ions in the surface layer of glass for the larger potassium ions.

Another proposal has involved spraying of the glass article with a salt solution containing potassium and then heat treating the sprayed glass container in order to effect an exchange of sodium ions in the glass for the larger potassium ions.

In both these cases the introduction of the larger potassium ions in place of sodium ions in the surface glass places the surface of the glass container in compression. However, these processes suffer from the disadvantage that a long time is required to effect the ion exchange because the process is carried out at temperatures below the glass transition temperature. Increasing the temperature of treatment reduces the time significantly but there is an increased risk that the articles will distort in an unacceptable manner. This temperature limitation also prevents the use of other strengthening processes which otherwise could be considered.

SUMMARY OF THE INVENTION

According to the present invention an article of glassware of improved strength is obtained as a result of a treatment of the parison from which the glassware article is formed, the treatment of the parison being such that the surface layer of the resultant glassware article is in compression.

According to one aspect of the present invention therefore there is provided a method of making an article of glassware comprising the steps of forming a parison from a gob of molten glass in a blank mould, allowing the outer surface of the parison to reheat when the parison is no longer in contact with the blank mould, forming the article of glassware from the reheated parison in a blow mould, and thereafter cooling the formed glassware article, wherein the outer surface of the parison is treated during the reheating step in a manner which will cause the glass in the outer surface layer of the formed glassware article to be in a state of compression.

The state of compression in the outer surface layer of the glassware article may be achieved without any other process step than the treatment of the parison during the reheating step, or there may be an additional easy and relatively quick further treatment of the glassware article to produce the outer surface layer which is in compression consequent upon the treatment of the parison.

According to another aspect of the present invention there is provided a method of making a glass container comprising the steps of forming a parison from a gob of molten glass, applying a glaze to the outer surface of the parison, forming from the parison a glass container the outer surface of which is constituted by the glaze, and thereafter cooling the formed glass container to obtain a glass container the outer surface of which is in a state of compression.

The glaze which is applied to the outer surface of the parison may consist of a glass having a coefficient of thermal expansion lower than the coefficient of thermal expansion of the glass from which the parison has been formed.

Alternatively, the glaze which is applied to the outer surface of the parison may be such that, after the glass container has been formed, a treatment of the glaze, for example a heat treatment, will cause at least partial crystallisation of the glaze to produce on the glass container a surface layer which has a lower coefficient of thermal expansion than the glass of the container.

As a further alternative, the glaze which is applied to the outer surface of the parison may be a mixture of a glass having a similar coefficient of thermal expansion to the the glass from which the parison has been formed and crystals having a lower coefficient of thermal expansion than the glass from which the parison has been formed.

According to a further aspect of the present invention there is provided a method of making a glass container comprising the steps of forming a parison from a gob of molten glass, treating the glass in the surface of the parison to change the chemical composition of the glass in the surface of the parison such that the glass in the surface of the parison has a higher transformation temperature than the remainder of the glass in the parison, forming a glass container from the treated parison, and thereafter cooling the formed glass container to obtain a glass container of which the outer surface is in a state of compression.

According to a still further aspect of the present invention there is provided a method of making a glass container comprising the steps of forming a parison from a gob of molten glass, applying a glaze to the outer surface of the parison, treating the glaze to change the chemical composition of the glaze such that the glaze has a higher transformation temperature than the glass from which the parison was formed, forming a glass container from the treated parison and thereafter cooling the formed glass container to obtain a container the outer surface of which is in a state of compression.

The essence of all these methods in accordance with the present invention is that a treatment which will result in a stronger article of glassware, such as a glass container, is effected during the manufacture of the glassware article in the period between the blank and blow stages of the glassware forming process. Processes according to the invention may be performed in any glassware forming machine in which there is the possibility of access to the parison during the reheat phase. In particular processes according to the invention can be performed in machines such as the Emhart TF and ITF machines, certain rotary types of machines such as the Emhart H-28 machine and the Heye 1-2 machine, and in the Heye 6-12 turret chain machine.

Many advantages are obtained by applying a strengthening treatment to the parison during its period of reheating between the parison forming stage and the formation of the glassware article in a blow mould. Many of these advantages arise from the higher surface temperature and greater heat content of the parison together with the fact that the final shape of the container or other glassware article has not yet been reached, so that any changes of shape that do occur as a result of the treatment may be compensated for either by changes to the initial parison shape or by changing the machine operating parameters. The higher temperatures greatly increase the rate of any chemical process, substantially reducing the time required for treatment. A further advantage of applying treatments to the parison is that the glass surface is still in a relatively undamaged state whereas treatments applied to the finished glassware article are being applied to a colder surface which has already received damage from contact with the blow mould and the hot-end handling system.

Strengthening treatments that may be advantageously applied to the parison include:

1. Applying a surface glaze with a coefficient of thermal expansion lower than that of the base glass. The glaze may be applied by any of the following methods:
   Dipping the parison into a bath containing the molten glaze.
   Spraying on a powdered glaze using an electrostatic or thermal spray system.
   Dipping the parison into a fluidised bed containing powdered glaze.
   Either of the last two methods may be followed by a fire polishing of the glaze if it is found that additional heat is needed to smooth the surface of the glaze.

2. Applying a surface glaze by any of the above methods and then, after the parison is blown into the container, applying a heat treatment to cause the glaze to at least partially crystallise to produce the required low expansion coating.

3. Applying, by any of the methods of paragraph 1 above, a surface glaze which is a mixture of a glass having a normal coefficient of thermal expansion and crystals having a very low coefficient of thermal expansion, for example $\beta$-eucryptite crystals.

4. To chemically change the surface of the glass to give the surface glass a higher transformation temperature than the base glass. On cooling this surface glass will stiffen before the base glass and be put into compression as the base glass cools and contracts. Methods for achieving this effect include:
   Treating the parison with a vapour containing lithium.
   De-alkalising the surface glass by:
     Treating the parison with a fluorine-containing gas such as 1.1 difluoroethane.
     Flame polishing the parison with a flame containing an aggressive gas (i.e. a gas which is chemically active in relation to the glass) such as $SO_2$, $SO_3$, chlorine or fluorine which will react with sodium in the glass.

5. To apply a glaze which is particularly susceptible to the above chemical treatments and then chemically treat either the glazed parison or the resulting container.

In order to ensure the effectiveness of any of the above treatments which involve the application of a glaze, the parison surface may be flame polished, with or without an aggressive gas, to remove any damage to the surface of the parison before the glaze is applied.

Experiment has shown that the surfaces of parisons with coatings or chemical treatments stretch in a reasonably uniform manner when blown and result in containers having a satisfactorily uniform modified surface. The amount of treatment given to various parts of the parison may be varied in order to vary the effectiveness of the treatment over the resulting container or other article of glassware.

Treatments in accordance with the present invention vary in the thermal effect which they have on the parison. Some may add heat to the parison while others may remove heat from the parison. In particular, the preferred processes in accordance with the present invention which involve the application of a glaze to the outer surface of the parison, do not all have the same thermal effect on the parison. Of the four general methods of applying glaze to the outer surface of a parison the dipping of the parison into a bath containing the molten glaze (the Melt Dip process) and the spraying of a powdered glaze onto the parison using a thermal spray system (the Flame Spray process) both add heat to the parison, whereas the spraying of a powdered glaze onto the parison using an electrostatic system (Electrostatic Spray) and the dipping of the parison into a fluidised bed containing powdered glaze (the Fluidised Bed process) both apply the glaze at a temperature substantially lower than the temperature of the parison.

Accordingly, use of either the Flame Spray or Melt Dip processes cause the parison to run faster and make it harder to control, whereas the Electrostatic Spray and Fluidised Bed processes, being cold applications, freeze the parison.

In order to compensate for the effects on the parison of different treatments in accordance with the present invention, alternative shapes of parison are used for forming the same standard glass container depending on whether the type of treatment which is being used adds heat to the parison or removes heat from the parison.

BRIEF DESCRIPTION OF THE DRAWINGS

The present invention will be further understood from the following detailed description of preferred examples thereof during which reference will be made to the accompanying drawings, in which:

FIG. 1 shows a standard glassware container to the manufacture of which treatments in accordance with the present invention have been applied, and FIG. 2 illustrates in cross-section two different shapes of parison employed in making the container of FIG. 1 using different treatments in accordance with the present invention.

DETAILED DESCRIPTION

In FIG. 1 of the accompanying drawings there is shown a standard glass container 1 which is to be strengthened by a treatment of the outer surface of the parison in accordance with the present invention. The container has a circular bearing surface 2 at its base.

In FIG. 2 the outline of the standard glass container 1 is again shown and there are also shown in cross section the halves of two different parisons 3 and 4 used to make the glass container 1.

A Parison A whose left hand half 3 is shown in FIG. 2 is used when the treatment in accordance with the present invention will add heat to the parison as in, for example, the Flame Spray and Melt Dip processes. A Parison B whose right hand half 4 is shown in FIG. 2, and which is of greater length than Parison A, will be used when the treatment in accordance with the present invention removes heat from the parison as in, for example, the Fluidised Bed and Electrostatic Spray processes.

In all the Examples in accordance with the present invention which follow, the treatment was applied to a parison during the manufacture of a glassware container from a soda-lime-silicate glass having the chemical composition by weight:

| | | |
|---|---|---|
| $SiO_2$ | | 73.8% |
| $Na_2O + K_2O$ combined | | 15.1% |
| CaO | | 7.5% |
| MgO | | 2.0% |
| $Al_2O_3$ | | 1.3% |
| | balance | 0.3% |

Two specific glazes based on zinc borate are mentioned in the Examples, namely a 60/40 zinc borate glaze and a glaze known as X49BK, the composition of which by weight is:

| | |
|---|---|
| ZnO | 54.4% |
| $B_2O_3$ | 27.0% |
| $V_2O_5$ | 9.2% |
| $SiO_2$ | 4.7% |
| $Al_2O_3$ | 4.7% |

The coefficient of thermal expansion of the soda-lime-silicate glass is $88 \times 10^{-7}$ per degree C whereas the approximate coefficients of thermal expansion of the two glazes are:

| | |
|---|---|
| zinc borate | $50 \times 10^{-7}$ per degree C. |
| X49BK | $47 \times 10^{-7}$ per degree C. |

In the Examples which follow the treatment in accordance with the present invention was carried out in the intermediate station of an Emhart TF machine having features such as are described generally in UK Patent Specifications Nos. 1,491,859 and 1,599,802.

EXAMPLE 1

A parison having the shape 3 of Parison A was formed from the soda-lime-silicate glass whose composition is given above in a blank mould by a plunger pressing process. The formed parison was removed from the blank mould and transferred to an intermediate station where re-heating of the outer surface of the parison was allowed to take place.

While the parison was being held by its finish in the intermediate station the parison was rotated at approximately 70 revolutions per minute. Dried particles of X49BK of a particle size 20-50 microns were applied to the parison using a Metco 6PII flame spray gun. Oxygen and acetylene gases were used to supply the flame and the X49BK was carried into the flame by a stream of nitrogen gas. The period of application of the spray was 3.4 seconds. The spray gun was arranged at a distance of approximately 25 cms from the parison and at an angle of approximately 30° to the horizontal below the base of the parison to direct the particles onto the rotating surface of the parison. Whilst the parison was rotating the flame spray gun was traversed vertically to cover the base and the lower one third to one half of the parison. The particles forming the powder were fed through the spray gun at a rate of 75 grams per minute.

After the treatment for 3.4 seconds with the X49BK the parison was transferred to the blow mould and a glass container 1 was formed and subsequently cooled.

This process was repeated in a run during which about 3000 containers were formed. Then some 20 samples of 24 containers each were selected at random from this run for examination.

Examination of the containers in these samples showed that in every case the outer surfaces of the containers had a continuous coating of glaze on the bottom and bearing surfaces and on the lower parts of the side walls. The glazes on the side walls of the containers varied in thickness from 22-37 microns while the glazes on the bases of the containers generally had thicknesses of the order of 100 microns.

After eliminating from each sample of 24 containers those containers which had manufacturing defects, for example defects in the finish due to handling or powder contamination, or due to stones in the base glass from the feeder, the internal pressure strength of the remaining coated containers was tested. It was found that, on average, the internal pressure strength of the coated containers averaged 447 as compared with an average internal pressure strength of corresponding uncoated containers of 294, giving an increase in pressure strength in the order of 50% as a result of application of glaze to the parison.

Samples of glass containers having a coating of the X49BK glaze were also subjected to hot to cold thermal shock tests. It was found that, whereas uncoated glass containers would not withstand a thermal shock in excess of 80° C., containers coated with X49BK glaze which were tested all withstood a thermal shock of 130° C., and one withstood a thermal shock of 150° C.

EXAMPLE 2

The process of Example 1 was repeated with a similar glass and under exactly similar conditions except that the particles used were particles of a 60/40 zinc borate.

Examination of samples of 24 randomly selected coated glass container formed by this method again showed a continuous coating of glaze on the bottom and bearing surfaces of all containers, and these coated containers had properties similar to those quoted for the coated containers of Example 1.

The thickness of the coating applied by the Flame Spray method as described in Examples 1 and 2 can readily be varied by changing the flame spray application time and the parameters of the apparatus set-up and operation.

EXAMPLE 3

A parison having the shape 4 of Parison B was formed from soda-lime-silicate glass in the same manner as in Example 1 and transferred to an intermediate station.

A fluidised bed was formed beneath the parison in the intermediate station using particles of X49BK of particle size 50 to 100 microns in a Techne SBS electrically heated fluidised bed using air at 3 psi as fluidising gas. The fluidised bed was maintained at a temperature of the order of 350° C.

The parison held by jaws in the intermediate station was lowered into the fluidised bed for a period of 1.2 seconds and raised out of the fluidised bed. As the parison emerged from the bed the coating on its outer surface was powdery and was then glazed by heat from the interior body of the parison.

The coated parison was then transferred to a blow mould and a glass container similar to glass container 1 was formed.

Randomly selected samples of 24 containers each produced in this way were examined and, after eliminating containers with manufacturing defects, it was shown that the average pressure strength of a glass container coated with X49BK by this fluidised bed method was 522 psi compared with an average of 286 psi for similar uncoated glass containers. The coated containers were found to have a glaze of thickness varying from 55 microns on the lower side walls of the container to 77 microns nearer the top of the container and a bottom coating of thickness up to 230 microns.

EXAMPLE 4

The process of Example 3 was repeated but using particles of 60/40 zinc borate in the fluidised bed instead of the X49BK.

After elimination of defective glass containers it was found that the average pressure strength of glass containers coated with zinc borate was 456 psi compared with an average of 286 psi for similar uncoated glass containers.

In order to provide a significant increase also in the impact strength of the containers produced in Examples 1 to 4 where a high compressive stress was formed in the outer surface of the final glass container, the parison was additionally treated by introducing into the interior of the parison at the intermediate station a material such as potassium pyrosulphate $K_2S_2O_7$ which produces active gases upon heating. The presence of the resulting compressive layer on the internal surface of the glass container balanced the compressive layer on the outer surface of the glass container and resulted in coated glass containers with a substantially improved impact strength as compared with uncoated glass containers.

The thickness of the coating applied by the Fluidised Bed method of Examples 3 and 4 can readily be varied by changing the time for which the parison is dipped into the fluidised bed and the temperature of the parison.

The tests of internal pressure breaking strength showed that, whereas in 80% of the uncoated containers the fracture originated in the bearing surface of the container, in containers coated by the methods of Examples 1 to 4 the fractures originating in the bearing surface were only 8% of the total.

Tests of other methods in accordance with the present invention have been made and give indications that they can be further developed to produce glass containers of increased strength. However the test conditions were such that it was not possible to produce detailed results of the kind described in Examples 1 to 4.

We claim:

1. A method of making an article of glassware comprising the steps of forming a parison from a gob of molten glass in a blank mould, allowing the outer surface of the parison to reheat when the parison is no longer in contact with the blank mould, forming the article of glassware from the reheated parison in a blow mould, and thereafter cooling the formed glassware article, wherein the outer surface of the parison is treated during the reheating step in a manner which will cause the glass in the outer surface layer of the formed glassware article to be in a state of compression.

2. A method according to claim 1, wherein there is applied to the outer surface of the parison a glaze having a coefficient of thermal expansion lower than the coefficient of thermal expansion of the glass from which the parison has been formed.

3. A method according to claim 1, wherein a glaze is applied to the outer surface of the parison, and wherein, after the glassware article has been formed from the parison, the glaze is at least partially crystallised to produce an outer surface of the glassware article having a lower coefficient of thermal expansion than the base glass of the glassware article whereby the outer surface of the cooled glassware article is in a state of compression.

4. A method according to claim 1, wherein there is applied to the parison a glaze containing crystals having a lower coefficient of thermal expansion than the glass from which the glassware article is being formed.

5. A method according to claim 2, wherein the glaze is applied to the outer surface of the parison by dipping the parison into a bath containing the molten glaze.

6. A method according to claim 2, wherein the glaze is applied to the outer surface of the parison by spraying a powdered glaze on to the outer surface of the parison.

7. A method according to claim 6 including the further step of fire polishing the outer surface of the parison during the reheating step and before the glaze is applied thereto.

8. A method according to claim 6, which further includes the step of fire polishing the glaze on the outer surface of the parison before the glassware article is formed from the parison.

9. A method according to claim 2, wherein the glaze is applied to the outer surface of the parison by dipping the parison into a fluidised bed containing powdered glaze.

10. A method according to claim 9 including the further step of fire polishing the outer surface of the parison during the reheating step and before the glaze is applied thereto.

11. A method according to claim 9, which further includes the step of fire polishing the glaze on the outer surface of the parison before the glassware article is formed from the parison.

12. A method of making a glass container comprising the steps of forming a parison from a gob of molten glass, applying a glaze to the outer surface of the parison, forming from the parison a glass container the outer surface of which is constituted by the glaze, and thereafter cooling the formed glass container to obtain a glass container the outer surface of which is in a state of compression.

13. A method according to claim 12, wherein the glaze which is applied to the outer surface of the parison has a coefficient of thermal expansion lower than the coefficient of thermal expansion of the glass from which the parison has been formed.

14. A method according to claim 12 including the further step of at least partially crystallising the glaze on the surface of the formed glass container to produce a surface layer on the glass container which has a lower coefficient of thermal expansion than the base glass of the container.

15. A method according to claim 12, wherein the glaze which is applied to the outer surface of the parison is a mixture of a glass having a similar coefficient of thermal expansion to the glass from which the parison has been formed, and crystals having a lower coefficient of thermal expansion than the glass from which the parison has been formed.

16. A method according to claim 2 including the further step of treating the interior of the parison during the reheating step in a manner which will cause the glass in the interior surface layer of the formed glassware article to be in a state of compression.

17. A method of making an article of glassware according to claim 1, wherein the glass in the outer surface of the parison is chemically changed during the reheating step so that the surface glass in the parison has a higher transformation temperature than the remainder of the glass in the parison such that on cooling the surface glass of the formed glassware article will stiffen before the remainder of the glass and the surface glass will be put into compression as the remainder of the glass in the glassware article cools and contracts.

18. A method according to claim 17, wherein the chemical change in the glass in the outer surface of the parison is effected by a treatment with a vapour containing lithium.

19. A method according to claim 17, wherein the chemical change in the glass in the outer surface of the parison is effected by de-alkalising the glass in the said outer surface.

20. A method according to claim 17, wherein the chemical change in the glass in the outer surface of the parison is effected by treatment with a fluorine-containing gas.

21. A method according to claim 17, wherein the chemical change in the glass in the outer surface of the parison is effected by flame polishing.

22. A method of making a glass container comprising the steps of forming a parison from a gob of molten glass, treating the glass in the surface of the parison to change the chemical composition of the glass in the surface of the parison such that the glass in the surface of the parison has a higher transformation temperature than the remainder of the glass in the parison, forming a glass container from the treated parison and thereafter cooling the formed glass container to obtain a glass container of which the outer surface is in a state of compression.

23. A method of making a glass container comprising the steps of forming a parison from a gob of molten glass, applying a glaze to the outer surface of the parison, treating the glaze to change the chemical composition of the glaze such that the glaze has a higher transformation temperature than the glass from which the parison was formed, forming a glass container from the treated parison and thereafter cooling the formed glass container to obtain a container the outer surface of which is in a state of compression.

* * * * *